Figure 4:
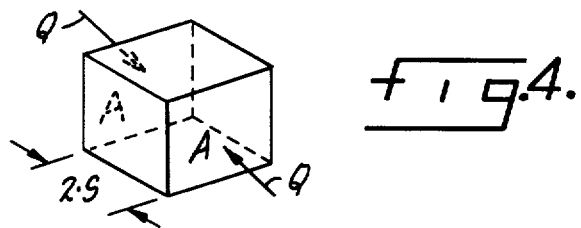

United States Patent [19]

Platell

[11] 4,445,499
[45] May 1, 1984

[54] GROUND-STORAGE OF HEAT SUCH AS SOLAR HEAT

[75] Inventor: Ove B. Platell, Sigtuna, Sweden

[73] Assignee: Sunstore Kommanditbolag, Malmo, Sweden

[21] Appl. No.: 112,518

[22] Filed: Jan. 16, 1980

Related U.S. Application Data

[63] Continuation-in-part of Ser. No. 866,719, Jan. 3, 1978, abandoned, which is a continuation-in-part of Ser. No. 841,818, Oct. 13, 1977, abandoned.

[30] Foreign Application Priority Data

| Nov. 1, 1976 [SE] | Sweden | 7612143 |
| Sep. 26, 1977 [SE] | Sweden | 7710748 |

[51] Int. Cl.³ .............................................. F24J 3/02
[52] U.S. Cl. ..................................... 126/430; 126/400
[58] Field of Search ................. 126/400, 430; 165/45; 138/27

[56] References Cited

U.S. PATENT DOCUMENTS

| 345,586 | 7/1886 | Hall | 138/27 X |
| 2,559,870 | 7/1951 | Gay | 237/1 A X |
| 3,485,216 | 12/1969 | Lawrence | 126/400 X |
| 3,989,927 | 11/1976 | Erb | 126/400 X |
| 4,024,910 | 5/1977 | Werner | 165/45 |
| 4,054,246 | 10/1977 | Johnson | 277/1 A |
| 4,061,267 | 12/1977 | Lof | 126/400 X |
| 4,089,373 | 5/1978 | Reynolds et al. | 165/45 X |

OTHER PUBLICATIONS

"Accumulation of Low Grade Heat in the Ground", Bjorn Modin, vvs No. 9, 1978.

Primary Examiner—William E. Tapolcai
Attorney, Agent, or Firm—Kinzer, Plyer, Dorn & McEachran

[57] ABSTRACT

A method of storing thermal energy in a body which is in direct thermal contact with the surrounding earth. The energy is transferred to said ground body from heat absorbing devices, specifically solar heat absorbing devices, by circulating a liquid in a circuit incorporating a plurality of channels in the ground body and said heat absorbing devices. The thermal energy stored in the ground body is removed therefrom by means of the circulating liquid and used to control the heat of an object such as a building by circulating the heated liquid around the building in a further circuit incorporating further channels and heat emitting devices. The channels in the ground body are arranged and sized in accordance with the calculated amount of thermal energy supplied to and taken out of the ground body period such as one year. A defined surface surrounding the ground body is established at a distance from the most remote of the channels in a direction outwardly of the ground body so to reach a maximum temperature on the order of 35° C. and a temperature variation during the period of energy input and output of not more than 10° C.

8 Claims, 10 Drawing Figures

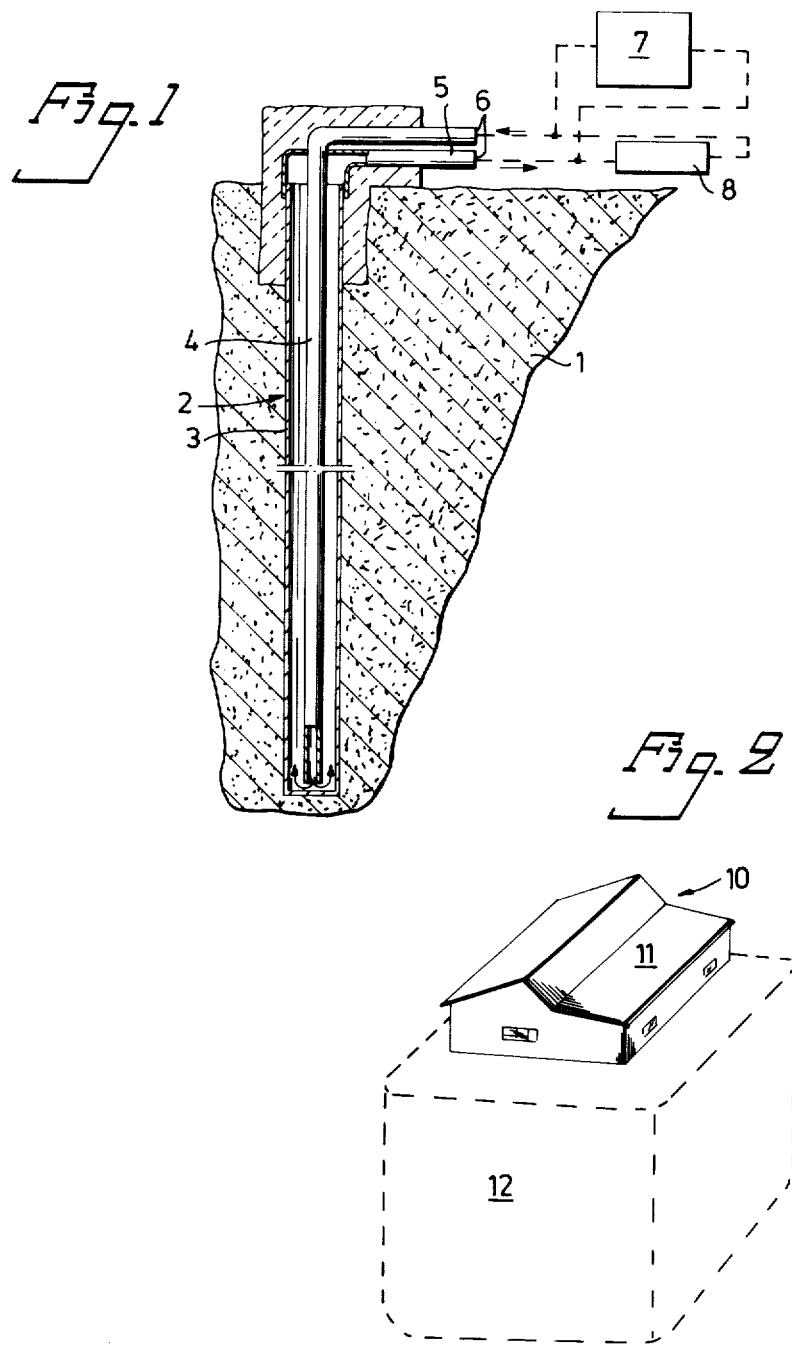

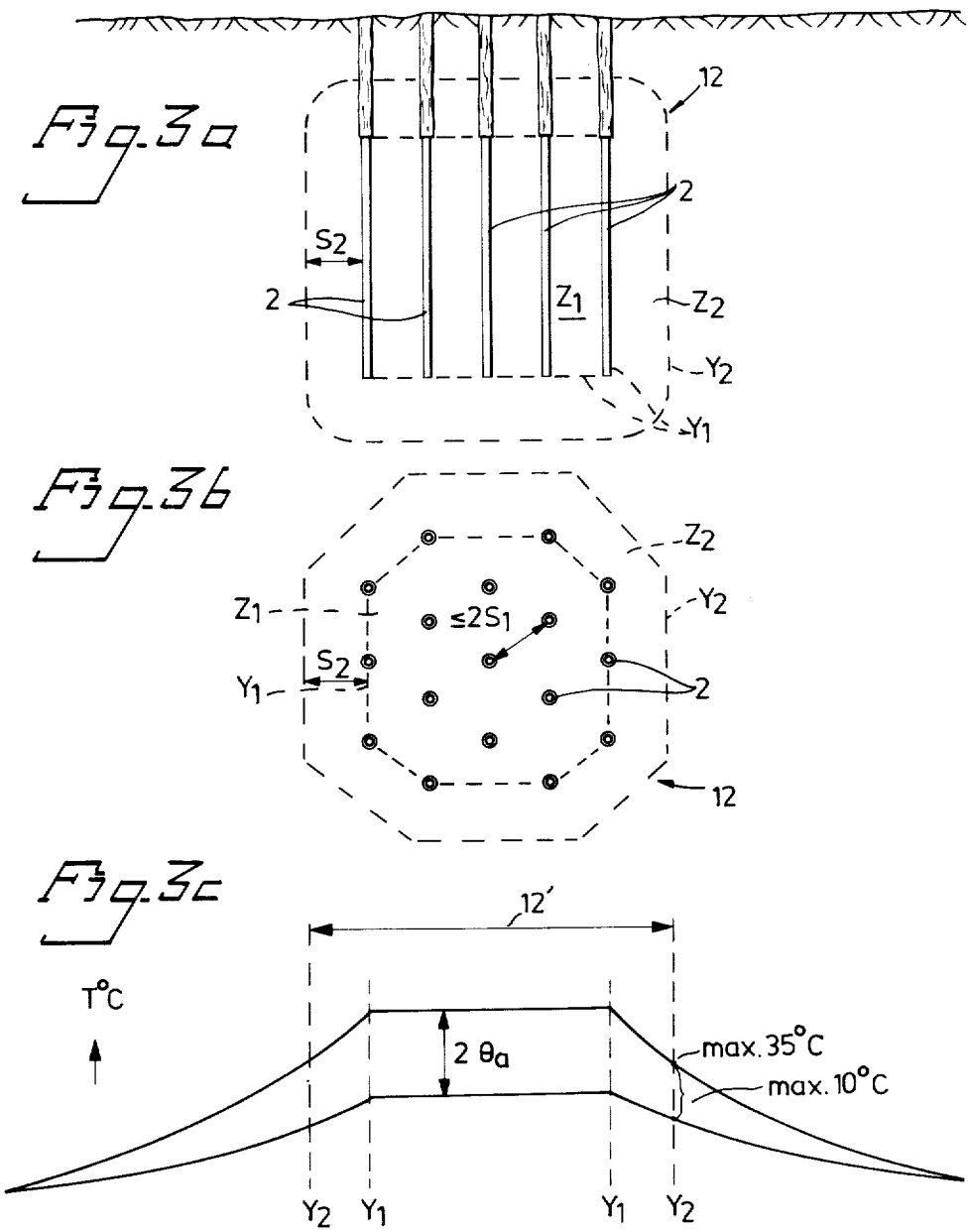

GROUND-STORAGE OF HEAT SUCH AS SOLAR HEAT

This is a continuation in part of my application Ser. No. 866,719, filed Jan. 3, 1978, and now abandoned, which is a continuation in part of my application Ser. No. 841,818, filed Oct. 13, 1977 and now abandoned.

The present invention relates to a method of storing thermal energy in a body which is in direct thermal connection with the surrounding earth, said body being hereinafter referred to as the ground-body, and said energy being transferred to said body from heat-absorbing devices, such as solar-heat absorbing devices, by circulating a liquid in a circuit incorporating a plurality of channels and said heat-absorbing devices, and in which method thermal energy stored in said ground-body is removed therefrom by means of said circulating liquid and is used to heat an object, such as a building, by circulating said liquid around said object in a further circuit incorporating further channels and heat-emitting devices.

It is necessary within a number of energy-supply fields to store heat. One particular example of current interest is the need of storing radiated and absorbed solar heat. When buildings, for example, are heated by means of solar energy, it is necessary that energy obtained in the form of heat during sunny periods can be stored until those times when the sun is not so bright. For example, it is desirable to be able to store solar heat from the summer period to the winter period of a year.

A similar heat-storage requirement is found when using wind energy for local-heating purposes. There are many industries in which large quantities of heat are obtained at relatively low temperatures, which heat could be used, for example, for central heating purposes. The absence of any economic possibility of storing this heat until there is a requirement for it means that large quantities of energy are wasted.

Such heat-storage possibilities are also desirable in the case of, for example, power station, where large variations in the requirement of electricity renders rational utilization of heat production impossible.

The combustion of waste material combined with an inexpensive method of storing heat would enable a source of energy to be utilized which today is not used.

An inexpensive and simple method of storing energy which can be applied on a small scale would also encourage members of the public to utilize waste material in a rational and effective manner, which material would otherwise not be used.

Several methods of storing heat are applied today. Different materials are used for heat-storing purposes. One method utilizes the specific heat of the material by heating the same. Other methods utilize the melting heat or heat of vaporization of a material, by supplying the heat at the melting point and boiling point respectively of said material. A further method is one in which the energy released during the recrystallization of certain materials is used for heating purposes. Certain methods are used today in developed systems, while other methods are still in the development stage. Whichever of these methods is applied depends upon the desired working-temperature range, the compactness of the system used, the extent to which heat losses can be accepted, the power output per weight/volume, and the cost of the system etc.

One common drawback with the aforementioned methods is that not one of them is intended, nor yet suitable, for storing heat from one part of a year to another. The longest periods over which heat can be stored by the best of the aforesaid methods is at most some weeks.

One example of heat storage is that in which energy obtained from a solar-absorbing device is stored in water. The heat energy stored shall be used for central heating purposes. If the solar heat obtained over a day shall be used for 24 hours and the temperature shall be 60°–95° C., a well-insulating water tank of 2–3 m$^3$ is required. When the sun is not so apparent, the water must be heated by some additional means. If this disadvantage is to be removed, a larger solar-heat absorbing device and a larger heat-storage unit can be built. The costs involved herewith, however, are impractical with respect to the present day cost of energy.

A more interesting heat-storage method has been proposed in recent time, this method requiring a ground-body to be in direct thermal connection with surrounding earth, as mentioned in the introduction. According to one proposal, the channels arranged in the ground-body may consist of drill-holes in the ground, there being submerged in each hole a coiled pipe through which a fluid flows. In accordance with another proposal, the channels consist of shafts blasted in a mountain or hill in accordance with a certain pattern and connected together by drill holes. In both cases, the liquid flowing through the channels must be heated to high temperatures (normal radiator-temperature is at least 50° C.) and a complicated control system for controlling the input and output of the thermal energy must be provided. As a result of the high temperatures, losses to the surrounding earth and losses occurring during passage of the liquid around said circuit are vey high, since, for example, the surrounding earth has a much lower temperature (in Stockholm 8° C.). If solar-heat absorbing devices are used, the efficiency of such devices is very poor at high temperatures. These disadvantages are so considerable in practice, that it has not been possible to apply the method under realistic and economically defensible conditions.

What is desired in a heat-storage system which, without incurring excessively high costs, can be made:
  with a sufficiently high storage-capacity, with which losses can be compensated economically, for example
  with solar-heat absorbing surfaces, and with the application of simple techniques and the use of simple materials.

This has been achieved in accordance with the invention by the fact that the channels are arranged in such numbers and are given such dimensions and are distributed in such a way, all in dependence upon the calculated amount of thermal-energy supplied and taken out over a long period of time, e.g. one year, that a defining surface surrounding said ground-body at a distance $$s_2 = \frac{a}{\omega}$$

where $$a = \frac{\lambda}{\rho \cdot c_p},$$

where ω is the frequency of the temperature variation (periodic)

$c_p$ = the specific heat of the ground body
$\lambda$ = the thermal conductivity of the ground body, and
$\rho$ = the density of the ground body, from locations or points on the remotest of the channels calculated in all directions outwardly from the ground body, obtains a highest temperature of the order of 35° C. and a variation over a period of time of at most 10° C., said variation being dependent upon the supply and removal of energy.

The invention is based on the fundamental difference, compared with previously proposed methods, that a temperature of the defining surface surrounding the ground-body as low as approximately 35° C. is used.

When using solar-heat absorbing devices, it is an advantage if the liquid leaving said devices has a temperature restricted to at most 45° C., preferably 35° C., whereby the solar-heat absorption devices can be of extremely simple construction and still have a very high efficiency, even higher than the most sophisticated, focused solar-heat absorption devices which work at temperatures of up to 100° C. with regard to the fluid. A high total efficiency is obtained, particularly in combination with low temperature of the heat-emitting devices.

The following are examples of the advantages afforded by the method according to the invention:

(a) The capacity of the system can be as high as required without incurring high costs,
(b) heat-leakage losses are so small that they can be compensated economically, for example, by increasing the absorbing area of the solar-heat absorbing devices,
(c) present day techniques can be applied and no complicated components are required,
(d) simple solar-heat absorbing devices can be used with a high degree of efficiency,
(e) no major thermal stresses or fatigue phenomena occur in the ground-body, and
(f) the maximum external temperature of the ground-body is so low that no ecological damage is done.

It will be understood that the heat-emitting system must be dimensioned so that the requisite quantities of heat can be transmitted from the liquid to the locality to be heated at a liquid temperature which does not differ from the temperature of said locality by more than 10° C.

The area of ground in which the system is installed comprises primarily an inner zone $Z_1$ (see FIGS. 3a and 3b) in which channels or ducts for supplying heat have been arranged. The limiting surface $Y_1$ for this zone comprises the surface which encloses the active ducts in the ground.

When calculating the storage capacity of said ground area, the aforementioned defined zone can be assumed to conform completely to the variations in temperature taking place in said ducts, provided that each element of volume of said ground-body lies at a distance of at most $s_1$ from anyone of said ducts.

Jacob, Heat Transfer, Sixth printing, March 1958, page 303, teaches us that $$s_1 \approx 0.7 \sqrt{\frac{1 \cdot a}{\omega}} \approx \sqrt{\frac{a}{\omega}}$$

where $$a = \frac{\lambda}{\rho \cdot c_p}$$

and ω = the frequence for the temperature variation (periodical), in which $\lambda$32 thermal conductivity of the ground-body
$\rho$ = the density of the ground-body, and
$c_p$ = to the specific heat emitted from the ground-body.

The distance between two adjacent ducts should therefore be less than $2 s_1$. With periodical variations in temperature in the defining surface of the zone, heat will migrate outwardly and inwardly from the surrounding earth. That heat which, in this way, is cyclically supplied and removed from the surrounding earth can be described according to Jacob: Heat Transfer, page 293, $$Q = Y_1 \cdot 2\theta_a \cdot \zeta \cdot \frac{1}{\sqrt{\omega}}$$

where $2\theta_a$ is the temperature variation (see FIG. 3c)

$$\zeta = \sqrt{\rho \cdot c_p \cdot \lambda}$$

This heat quantity Q can be stored in an outer zone $Z_2$ in the surface of the ground, which participates completely in (conforms to) the temperature variation $2_a$ of the area $Y_1$. The volume of this outer zone $Z_2$ can be written as $Y_1 \cdot s_2$, where $s_2$ can be interpreted as the "equivalent penetration depth" in the ground outside the zone $Z_1$. The volume of said earth area can thus be considered as the sum of the zones $Z_1$ and $Z_2$ and with a limiting surface $Y_2$ which lies at a distance $s_2$ from the surface $Y_1$.

$$\text{Thus, } Q = Y \cdot 2\theta_a \cdot \zeta \cdot \frac{1}{\sqrt{\omega}} = s_2 \cdot Y_1 \cdot 2\theta_a \cdot \rho \cdot c_p$$

whereupon there is obtained $$s_2 = \sqrt{\frac{a}{\omega}}.$$

It is thus found that $s_1 = s_2$.

In order that the earth used in the proposed heat-storing process is used optimally, the channels are distributed so that each volume of earth contributing towards the process has a greatest distance to each channel of approximately 1 meter in the case of earth which is very rich in water, to approximately 3 meters for earth which is relatively dry or rock, such as granite.

In order to optimize the possibility of the volume of earth contributing to the heat-storage process of realizing its maximum accessible effect, the total accessive surface area of the channels can be given a suitable magnitude by adjusting the effective length of the channel and the diameter thereof.

The requisite channels can be produced very simply if the features of the method disclosed in claims 5 or 6 are put into effect.

Figure 5:
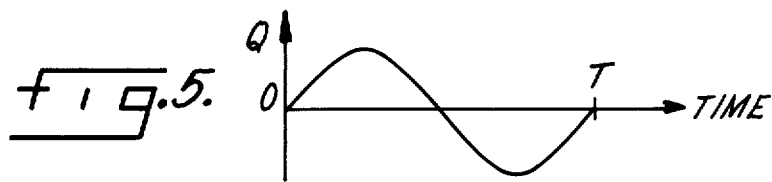
Figure 6:
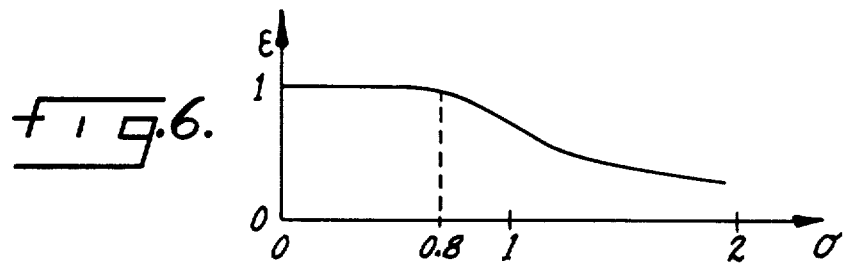
Figure 7:
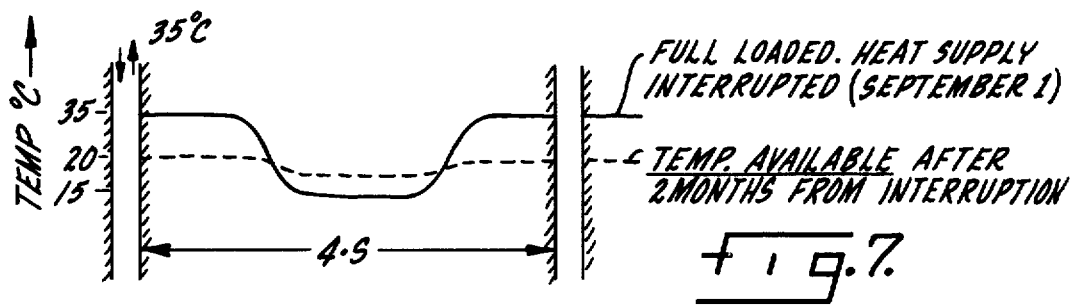
Figure 8:
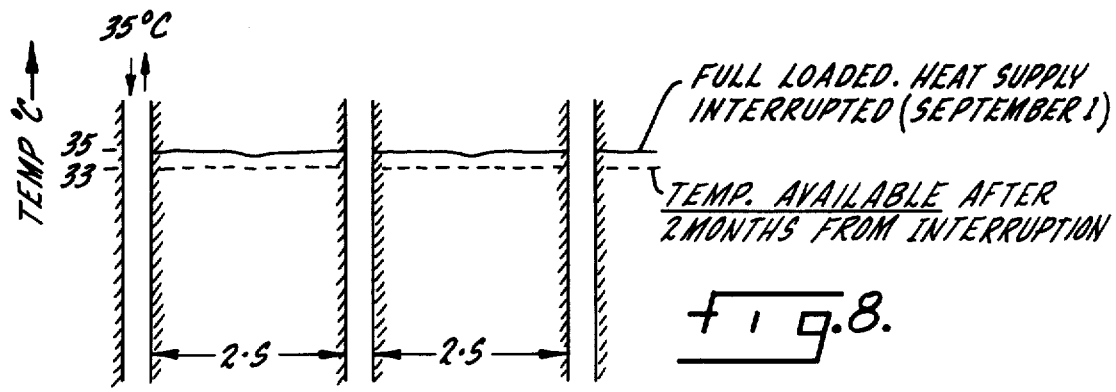

So that the invention will be more readily understood and further features thereof made apparent, an embodiment of the invention will now be described with reference to the accompanying drawings, in which FIG. 1 illustrates an embodiment of a simple ducting system created by means of drill holes, FIG. 2 illustrates schematically a ground-body located beneath a house and participating in a heat-storage system according to the invention, FIGS. 3a and 3b illustrate schematically a ground-body in two different views, FIG. 3c illustrates the area of the variations in temperature through a section of the ground-body, FIG. 4 is a schematic representation of a cubic body of earth, FIG. 5 is a graph of a time-temperature curve, FIG. 6 is a graph showing the ratio of heat utilization in the body of earth, FIG. 7 is a schematic showing of the temperature drop in a body of earth during withdrawal over a period of time when the heat ducts are spaced apart too great a distance; and FIG. 8 is a schematic showing of the temperature drop in a body of earth during withdrawal over a period of time when the heat ducts are spaced apart in accordance with the teachings of this invention.

FIG. 1 illustrates a channel or ducting path in a ground-body 1, said ducting path comprising an initial bore of 3 meters length and, for example, a 10 meter deep hole 2 having a diameter of, for example, 2.5 cm., this hole being lined with a hose 3 of, for example, aluminum foil to form a conduit, in which a pipe 4 is arranged concentrically therein. The lining 3, which has been pressed into abutment with the sides of the hole 2, is sealingly connected with a pipe 5 which, similarly to the pipe 4, is connected to a further pipe 6. These pipes together with a heat-supply means 7, for example, a solar-heat absorbing means, and a heat emitting means 8, for example a radiator, form a closed circuit for a liquid, such as water.

In order for the temperature of the earth not to be unduly affected by the heat-storage system, the upper part of the conduit is insulated along a distance marked $S_2$.

The drill holes 2 are placed apart by a distance of at most $2 \cdot s_1$, the magnitude of which depends upon the type of ground in which the holes are sunk, as evidenced herebelow:

| Type of ground | Distance 2 $s_1$ (cycle = 1 year)$^2$ $t^2$ |
| --- | --- |
| Granite | 6.4 m |
| Sand | 4.6 m |
| Moraine | 5.4 m |
| Clay | 3.5 m |
| Gyttja (sludge) | 2.0 m |
| Water | 1.8 m |

FIG. 2 illustrates a conventional house 10 having a length by width measurement of 15×8 meters built on rock and having a yearly energy requirement of 26 000 kWh, in which house a substantially horizontal solar-energy absorbing device 11 having an area of 40 m² is built into the roof. In order to cover 100% of the yearly energy requirement of this house using solar energy, there is required a ground-body 12 according to the invention having a volume of 2300 m³. Such a ground-body can be readily provided by drilling two rows of holes to a depth of 10 meters and an interspacing of approximately 6 m ($2s_1 = 6$ m). As will be readily understood, the drill holes need not be vertical but can be inclined to the horizontal if such is required. The ground-body extends (granite) approximately 3 meters outwardly from the two rows of drill holes, both laterally and downwardly (and also upwardly if the upper parts of the drill holes shall be insulated) and includes a volume $>2300$ m³.

FIG. 3a illustrates a vertical section through a ground-body 12 formed by five rows of vertical channels or ducts 2. A limiting surface $Y_1$ embraces the channels 2 and passes through the remotest channels and their end surfaces. The distances between the channels is at most the distance $s_1$ and the zone enclosed by the limiting surface $Y_1$ is designated $Z_1$.

Extending around the zone $Z_1$ is a zone $Z_2$ which has an extension $s_2$ out to a limiting surface $Y_2$. These zones and surfaces are shown in plan view in FIG. 3b.

FIG. 3c illustrates the temperature distribution within the extension 12 of the ground-body in a horizontal plane and the swing in temperature when supplying heat energy to the ground and removing energy therefrom by a magnitude of $2\theta_a$. The position of the limiting surfaces $Y_1$ and $Y_2$ shown in FIGS. 3a and b are indicated in FIG. 3c, as is also the temperature distribution externally of the outer limiting surface $Y_2$.

In order to increase the temperature of the ground-body to, for example, a level of 25° C. and 30° C., there is required initially a relatively large quantity of energy. This energy can be obtained, for example, by temporary solar-heat absorbing devices erected on the building site. Obviously, solar-heat absorbing devices are not the only devices which can be used for this purpose, but that other heat sources can be envisaged. Whatever device is used, the cost initially must be considered an investment.

In a manner similar to that described with reference to a conventional house, a high-rise flat can be heated by means of, for example, solar-heat absorbing devices in conjunction with a ground-body, as hereinbefore described, for supplying the block with low-temperature heating facilities. Economic gains can naturally be had by covering to 100% the heat requirements of a multi-story flat in this way.

In many instances, and in particular in countries where the temperature of the ground is in excess of 20° C. it may be suitable, in accordance with the same principle alternatively, or in addition, to arrange a cooler ground-body where the temperature is approximately 10°–15° C., for cooling a building which is constantly subjected to undesirable heat.

The heat-storage method according to the invention can also be used for controlling the heat of swimming pools.

The invention is generally applicable to varying supplies of thermal energy from solar-absorption devices, wind generators (via mechanical water brakes or electrical heaters), waste heat and varying or constant outputs of thermal energy, and also with the constant supply of thermal energy and varying outputs which momentarily may be greater than the energy supplied.

The dimensions which the ground-body shall be given and the manner in which the channels are distributed can, in certain cases, require complicated calculations. These calculations can, of course, be greatly facilitated by applying data-processing techniques.

As already mentioned heat emitting devices or radiators must have a large heat emitting surface and low surface temperature, 5 degrees C. above the room temperature, for example. Such a device may cover one or more wall surfaces or ceiling surfaces of a room. The heat emitting surface may consist, for example, of a thin board panel behind which air of a temperature of about 25 degrees C. is slowly flowing. The air is heated by tubes arranged across the air flow direction and behind the panel. The tubes carry the circulating liquid, which has a temperature of 27 degrees C. for example. A portion of the flowing air may consist of fresh air supplied by a small fan. Also the heat absorbing devices can be constructed in the same simple manner even if a more weather resistant panel is to be used, an aluminum plate for example.

An explanation of the usefulness of this invention is as follows:

We suppose that we have a cubic body of earth shown in FIG. 4. A sinusoidal temperature shown in FIG. 5 is applied to two parallel surfaces A of the body of FIG. 4, the space between them being 2·s. The quantity of heat fed to the two surfaces A during a half-period T is Q.

It is evident from Jacob, Heat-Transfer, pages 293–303 that a curve $\epsilon$ shown in FIG. 6 can be defined as Q in relation to $Q\infty$, where Q is the actual heat quantity fed to the body, and $Q\infty$ is the heat quantity fed to the body if the half-period is assumed to be infinitely long.

In other words $\epsilon$ is the ratio of utilization and is a function of $$\sigma = \frac{s}{\sqrt{\frac{2a}{\omega}}}.$$

You can see that $\epsilon = 1$ when $\sigma$ is small. When $\sigma$ has increased to about 0.8 $\epsilon$ starts decreasing as shown in FIG. 6. Thus, $\sigma$ should be smaller than 0.8 in order to utilize the body of earth optimally or in other words $$s < 0.8 \sqrt{\frac{2a}{\omega}}$$

or approximately $$s \approx 0.7 \sqrt{\frac{2a}{\omega}} \approx \sqrt{\frac{a}{\omega}}$$

which means the ratio of s to the depth of heat penetration.

It is important that the distance between the channels really is in the order of $$2 \cdot s = 2\sqrt{\frac{a}{\omega}}.$$

The distance may be reduced somewhat for instance in order to increase the total contact area between all the channels and the surrounding earth, but no increase of the capacity of the storage will be obtained in this way.

If the distance between the channels is increased e.g. to 4·s parts of the ground-body will remain "unloaded" into which parts heat will vanish when the supply of heat to the ground-body is interrupted, thus quickly reducing the temperature of the heat (energy) available in the channels later when energy is needed from the storage, as shown in FIGS. 7 and 8 schematically illustrating the temperature distribution in the ground-body between adjacent channels spaced the distance 4·s and 2·s, respectively.

The invention is not restricted to the described and illustrated embodiments, but can be modified within the scope of the accompanying claims.

I claim:

1. A method of arranged a ground-body in the earth for storing thermal energy in said ground-body which is in direct thermal connection with the surrounding earth, said energy being transferred to said body from heat-absorbing devices, such as thermal-heat absorbing devices, by circulating a liquid in a circuit incorporating a plurality of channels and said heat-absorbing devices, and thermal energy stored in said ground-body being transferred therefrom by means of said circulating liquid and used to control the heat of an object, such as a building, by circulating said heated liquid around said object in a further circuit incorporating said channels and heat-emitting devices, characterized by the steps of establishing the dimensions of the ground-body bounded by a defining surface surrounding said ground-body to provide a volume sufficient to heat said building during the anticipated heating season with the highest temperature of said defining surface not exceeding on the order of 35° C. with a variation during a long time period, e.g. one year, of at most 10° C. dependent on expected supply and out-take of energy, and arranging the channels in an inner zone ($Z_1$) of the ground-body defined by a limiting surface ($Y_1$) positioned at a distance s from the defining surface ($Y_2$), in which zone the channels are distributed so that the interspaces between adjacent channels do not exceed a value equal to twice the distance s, which distance is approximately one meter in the case of earth which is very rich in water, to approximately three meters for earth which is relatively dry and rock such as granite.

2. A method according to claim 1, for controlling the temperature of a building, characterized in that the liquid is supplied to the heat-emitting devices at a temperature which does not differ from the intended room temperature of the building by more than 10° C., preferably by more than 5° C.

3. A method according to claim 2, in which the heat-absorbing devices are solar-heat absorbing devices, characterized in that the liquid leaving said solar-heat absorbing devices has a temperature of at most 45° C. preferably 35° C.

4. A method according to claim 1, characterized in that the channels in the ground-body are produced by drilling a number of holes from the surface of the ground and inserting a lining, preferably a metal lining of requisite mechanical strength in each hole drilled, in which hole there is arranged a pipe concentric with said hole and open at the bottom thereof, said tubes and said lining being connected to further pipes to form at least one closed circuit incorporating the heat-emitting and heat-absorbing devices.

5. A method according to claim 1, in which the ground has a soft nature, characterized in that the channels are made in the ground-body by pressing therein to a number of pipers which are closed at the ends thereof pressed into the ground and in which there is arranged in each pipe a concentric inner pipe which is open at the closed end of the pipe, and in which outer and inner pipes are connected with pipes to form at least one closed circuit incorporating the heat-emitting and heat-absorbing devices.

6. A method of establishing a heat-storage zone in the earth which can be supplied with heat from heat-absorbing means during one season of the year and from which heat can be taken in another season of the year for distribution to heat-emitting means in a building or similar structure with the heat storage zone having sufficient capacity to store all of the heat necessary for the building during said another season without raising the temperature at the periphery of the storage zone in the earth above about 35° C. with the variation of the temperature at the periphery of the storage zone not to exceed 10° C. during the year, said method including the steps of:

forming a plurality of channels in the earth with the channels spaced a distance s from the periphery of the storage zone and a distance not exceeding 2s from one another, said distance s being approximately one (1) meter in the case of earth rich in water to approximately three (3) meters in earth which is relatively dry and rock such as granite, providing a liquid conduit between said heat-absorbing devices, said heat-emitting devices and said channels, and circulating said liquid between said heat-absorbing devices and said channels during one season of the year to store heat in said heat storage zone and circulating said fluid between said channels and said heat-emitting devices during another season of the year to remove heat from said heat storage zone.

7. The method of claim 1 in which the channels include bores drilled in the earth and pipe inserted in the bores to form part of the circuit including the heat absorbing devices, with the pipe being introduced into the bores from the surface of the ground-body.

8. The method of claim 7 in which the bores are lined with aluminum foil and the pipes are inserted in the bores inwardly of the aluminum foil lining.

* * * * *